(12) United States Patent
Christman

(10) Patent No.: US 7,689,091 B1
(45) Date of Patent: Mar. 30, 2010

(54) UNITARY FIBER CLAMP WITH FLEXIBLE MEMBERS AND A MEMBER MOVER

(75) Inventor: Joseph Armand Christman, San Jose, CA (US)

(73) Assignee: Newport Corporation, Irvine, CA (US)

( * ) Notice: Subject to any disclaimer, the term of this patent is extended or adjusted under 35 U.S.C. 154(b) by 0 days.

(21) Appl. No.: 12/359,296

(22) Filed: Jan. 24, 2009

Related U.S. Application Data

(60) Provisional application No. 61/062,578, filed on Jan. 28, 2008.

(51) Int. Cl.
*G02B 6/00* (2006.01)
(52) U.S. Cl. .................. 385/137; 385/134; 385/136
(58) Field of Classification Search .......... 385/136–137
See application file for complete search history.

(56) References Cited

U.S. PATENT DOCUMENTS

| | | | |
|---|---|---|---|
| 4,491,294 A * | 1/1985 | Blume et al. ............... | 248/251 |
| 4,755,018 A | 7/1988 | Heng et al. | |
| 4,756,518 A | 7/1988 | Varin et al. | |
| 4,871,227 A | 10/1989 | Tilse | |
| 6,074,103 A * | 6/2000 | Hargreaves et al. ......... | 385/90 |
| 6,414,785 B1 * | 7/2002 | Berto et al. ................ | 359/333 |
| 6,431,763 B1 | 8/2002 | Sherman et al. | |
| 6,559,464 B1 * | 5/2003 | Flanders et al. ........... | 250/548 |
| 6,625,372 B1 * | 9/2003 | Flanders et al. ........... | 385/134 |

(Continued)

FOREIGN PATENT DOCUMENTS

| | | |
|---|---|---|
| EP | 0224806 A1 | 6/1987 |
| EP | 1387196 A1 | 2/2004 |
| FR | 2593294 A1 | 7/1987 |
| GB | 2381325 A | 6/2007 |
| JP | 56077814 | 6/1981 |

OTHER PUBLICATIONS

Drawings of a Monet fiber clamp. The Monet clamp features a circular hole to hold the fiber. The diameter of the circular hole can be adjusted so that the Monet fiber clamp can clamp the fiber. The applicants admit that this is prior art, 2009.

(Continued)

*Primary Examiner*—Ryan Lepisto
(74) *Attorney, Agent, or Firm*—Roeder & Broder LLP

(57) ABSTRACT

A fiber clamp (220) for clamping an optical fiber assembly (16) includes a clamp housing (230) and a member mover (228). The clamp housing (230) includes a base contact area (234) and a flexible member (238) that urges the optical fiber assembly (16) against the base contact area (234) to retain the optical fiber assembly (16). Further, the flexible member (238) includes a member contact area (238B) that engages the optical fiber assembly (16), and a member attachment area (238A). The member mover (228) selectively moves the member contact area (238B) relative to the member attachment area (238A) so that the optical fiber assembly (16) can be easily inserted between the base contact area (234) and the member contact area (238B). Additionally, the base contact area (234), and the flexible member (238) can be made of a one-piece, substantially homogeneous, unitary structure. With this design, the fiber clamp (220) can be made with minimal stack-up of tolerances. Further, the careful manufacture of the fiber clamp (220) guarantees that the forces on all contact areas (234) (238B) between the fiber or ferrule and the fiber clamp (220) are essentially the same. Moreover, the value of the forces is defined by geometry choices and material selection.

13 Claims, 4 Drawing Sheets

U.S. PATENT DOCUMENTS

| | | | | |
|---|---|---|---|---|
| 6,644,862 | B1 * | 11/2003 | Berto et al. | 385/53 |
| 6,661,962 | B1 * | 12/2003 | Calvet et al. | 385/137 |
| 6,754,013 | B2 * | 6/2004 | Willis | 359/819 |
| 6,782,180 | B2 * | 8/2004 | Masghati et al. | 385/134 |
| 7,224,871 | B2 * | 5/2007 | Willis | 385/52 |
| 7,387,281 | B2 * | 6/2008 | Nakamura | 248/49 |
| 7,512,305 | B2 * | 3/2009 | Zheng et al. | 385/136 |
| 2004/0052447 | A1 | 3/2004 | Tamura | |
| 2007/0183733 | A1 | 8/2007 | Zheng et al. | |

OTHER PUBLICATIONS

Drawings of a Monet fiber clamp. The Monet clamp features a circular hole to hold the fiber. The diameter of the circular hole can be adjusted so that the Monet fiber clamp can clamp the fiber. The applicants admit that this is prior art.

\* cited by examiner

UNITARY FIBER CLAMP WITH FLEXIBLE MEMBERS AND A MEMBER MOVER

RELATED INVENTIONS

This application claims priority on U.S. Provisional Application Ser. No. 61/062,578, filed Jan. 28, 2008 and entitled "Unitary Fiber Clamp with Flexible Members and a Member Mover". As far as permitted, the contents of U.S. Provisional Application Ser. No. 61/062,578 are incorporated herein by reference.

BACKGROUND

Optical collimators are used to collect or direct an energy beam for optical communication, scientific instruments and other instruments. One type of optical collimator includes an optical element, an optical fiber, and a fiber clamp that retains a distal fiber end of the optical fiber. One type of fiber clamp circumferentially grips and retains the distal fiber end. Unfortunately, with this type of fiber clamp, the mechanical stress magnitude and field created in the fiber tip by locking the fiber clamp are relatively high, asymmetrical, and non-repeatable. Further, the polarization of an optical signal propagated through the optical fiber can be altered by changing the stress field in the fiber. The asymmetry and non-repeatability of the fiber clamp can cause unpredictable changes in the polarization of the optical fiber.

SUMMARY

The present invention is directed to a fiber clamp for clamping an optical fiber assembly. The fiber clamp includes a clamp housing and a member mover. The clamp housing includes a base contact area and a first flexible member that urges the optical fiber assembly against the base contact area to retain the optical fiber assembly. Further, the first flexible member includes a first member contact area that engages the optical fiber assembly, and a first member attachment area. The member mover selectively moves the first member contact area relative to the first member attachment area so that the optical fiber assembly can be inserted between the base contact area and the first member contact area.

With the designs provided herein, in certain embodiments, the fiber clamp applies a repeatable, regulated, symmetrical, substantially uniform, controlled, and consistent pressure to the optical fiber. Further, in certain embodiments, the fiber clamp imparts a plurality of spaced apart, substantially radially directed forces on the optical fiber assembly. Moreover, the radially directed forces can be symmetrically oriented.

In one embodiment, the member mover includes a threaded beam that urges the first member contact area away from the base contact area.

Additionally, the clamp housing can include a second flexible member that urges the optical fiber assembly against the base contact area. In this embodiment, the second flexible member includes a second member contact area that engages the optical fiber assembly, and a second member attachment area.

In one embodiment, the member mover can selectively move the second member contact area relative to the second member attachment area and the first member contact area so that the optical fiber assembly can be inserted between the base contact area and the member contact areas. Further, the member mover can extend between the flexible members to urge member contact areas apart. For example, the member mover can include a threaded beam that is threaded into the first flexible member. In this embodiment, (i) rotation of the threaded beam in a first rotational direction causes the threaded beam to engage the second flexible member to move the member contact areas apart, and (ii) rotation of the threaded beam in a second rotational direction causes the threaded beam to disengage from the second flexible member to allow the contact areas to move towards each other.

Additionally, as provided herein, the base contact area, and the one or more flexible member(s) can be made of a one-piece, substantially homogeneous, unitary structure. With this design, the fiber clamp can be made with minimal stack-up of tolerances. As a result thereof, the forces applied by the flexible members is consistent, controlled in magnitude and direction, and repeatable. As a further result thereof, the polarization of the optical signal in the optical fiber assembly is not significantly influenced. Stated in another fashion, a polarization extinction ratio ("PER") of the optical fiber assembly has a relatively small change when the fiber clamp is attached to the optical fiber assembly. Moreover, the design provided herein is relatively easy to manufacture and assemble.

Further, (i) the first member contact area can cantilever away from the first member attachment area and/or (ii) the second member contact area cantilevers away from the second member attachment area.

The present invention is also directed to a precision apparatus including an optical element, an optical fiber assembly, and the fiber clamp. Additionally, the present invention is directed to a method for clamping an optical fiber assembly. The method can include the steps of: (i) providing a clamp housing that including a base contact area, and a first flexible member that urges the optical fiber assembly against the base contact area to retain the optical fiber assembly, the first flexible member including a first member attachment area, and a first member contact area that engages the optical fiber assembly; and (ii) selectively moving the first member contact area relative to the first member attachment area so that the optical fiber assembly can be inserted between the base contact area and the first member

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
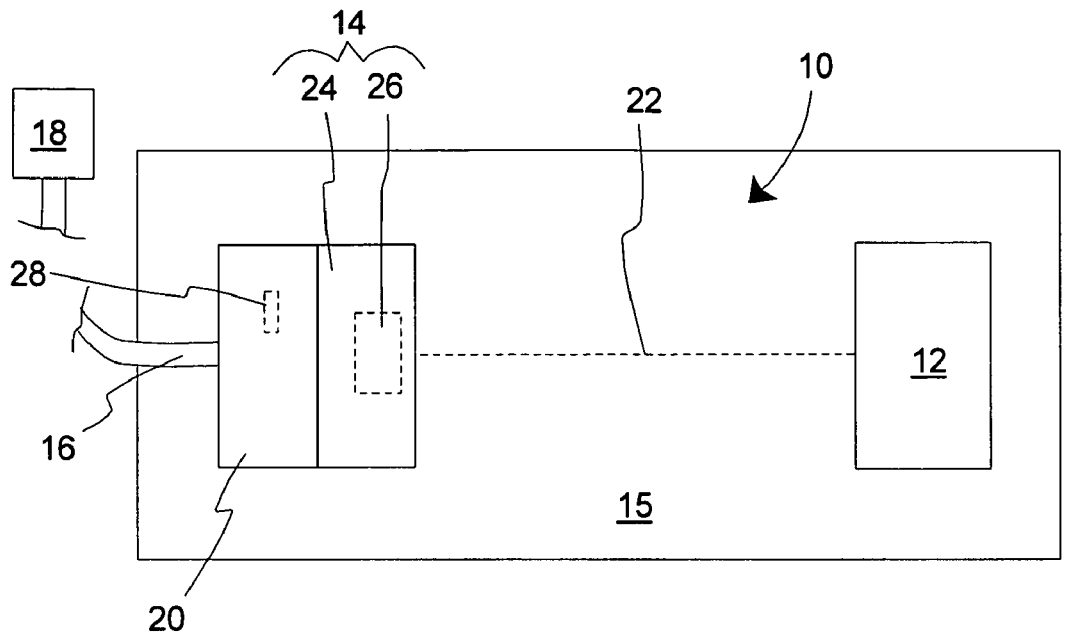
FIG. 1 is a simplified top plan view of a precision apparatus having features of the present invention.

Referring to FIG. 1, the present invention is directed to a precision apparatus 10 that, for example, can be used as or in manufacturing, optical communications, technical or scientific instruments. The design and orientation of the components of the precision apparatus 10 can be changed to suit the requirements of the precision apparatus 10. FIG. 1 is a simplified, non-exclusive top view of one embodiment of the precision apparatus 10. In this embodiment, the precision apparatus 10 includes a beam source 12, an optical assembly 14, an apparatus base 15, an optical fiber assembly 16, a beam sensor 18, and a fiber clamp 20. However, one or more of these components can be optional.

Some of the Figures include an orientation system that illustrates an X axis, a Y axis that is orthogonal to the X axis, and a Z axis that is orthogonal to the X and Y axes. It should be noted that these axes can also be referred to as the first, second, and third axes.

The beam source 12 generates a beam 22 (illustrated in phantom) of light energy that is directed at the optical assembly 14. In one embodiment, the beam source 12 is a laser source and the beam 22 is a small diameter optical beam.

The optical assembly 14 is positioned in the path of the beam 22 and focuses the beam 22. In one embodiment, the optical assembly 14 includes an assembly housing 24 and an optical element 26 (illustrated in phantom) that is retained by the assembly housing 24. As non-exclusive examples, the optical element 26 can be a fiber lens, a ball lens, aspherical lens, a focusing mirror, or another type of lens.

The apparatus base 15 retains some of the other components of the precision apparatus 10. In one embodiment, the apparatus base 15 is a generally rigid plate.

The optical fiber assembly 16 launches or collects a beam of light energy. In FIG. 1, the optical fiber assembly 16 collects the beam 22 that passes through the optical assembly 14 and transfers the beam 22 to the beam sensor 18. Alternatively, the precision apparatus 10 could be designed so that the optical fiber assembly 16 launches a beam of light energy or the precision apparatus 10 could be designed without an optical assembly 14. In one embodiment, the optical fiber assembly 16 includes a thin strand of transparent material that carries optical signals that can be made of glass and plastic.

The beam sensor 18 receives the beam collected by the optical fiber assembly 16 and measures the amount of light energy received.

The fiber clamp 20 clamps, holds and retains the optical fiber assembly 16. As an overview, in certain embodiments, the fiber clamp 20 retains the optical fiber assembly 16 in a fashion that applies a substantially uniform, repeatable, controlled force in magnitude and direction across the optical fiber 16. Further, the fiber clamp 20 is shaped to provide controlled force in magnitude and direction, even if the fiber tip of the fiber is irregular in shape.

Moreover, in certain embodiments, the fiber clamp 20 can be made with a unique one-piece structure that allows for relatively tight tolerances and/or the fiber clamp 20 can include a member mover 28 (illustrated in phantom) that allows the optical fiber assembly to be easily added or removed from the fiber clamp 20.

Figure 2A:
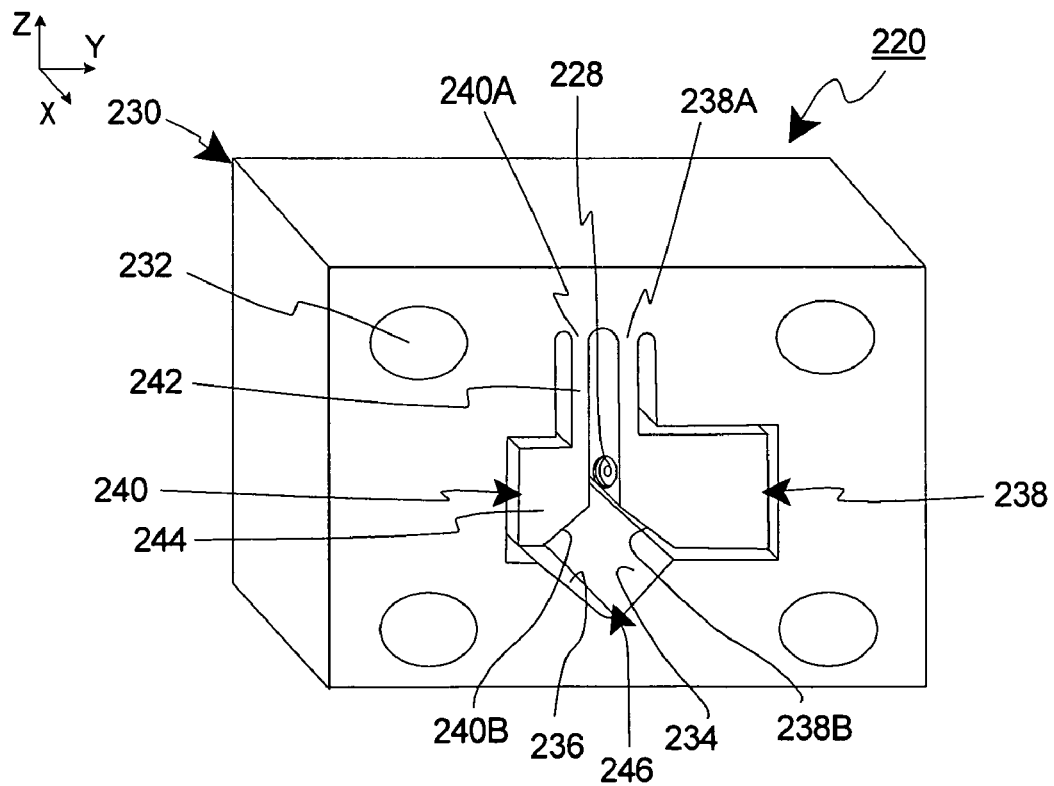
FIG. 2A is a simplified perspective view of a fiber clamp having features of the present invention.

FIG. 2A is a simplified perspective view of the fiber clamp 220. In this embodiment, the fiber clamp 220 includes a clamp housing 230 and the member mover 228. The design, size and shape of these components can be varied to suit the design requirements of the fiber clamp 220.

The clamp housing 230 supports and retains the optical fiber assembly 16 (illustrated in FIG. 1). In FIG. 2A, the clamp housing 230 is generally rectangular block shaped and includes a plurality of spaced attachment apertures 232 that can receive bolts (not shown) for securing the clamp housing 230 to the optical assembly 14 (illustrated in FIG. 1). Alternatively, the clamp housing 230 can having another configuration and/or the clamp housing 230 can be secured to the apparatus base 15 (illustrated in FIG. 1) in another fashion.

In FIG. 2A, the clamp housing 230 defines a fixed, first base contact area 234, a fixed second base contact area 236, a first flexible member 238, and a second flexible member 240 that cooperate to retain the optical fiber assembly 16. In this embodiment, the base contact areas 234, 236 are positioned below the flexible members 238, 240. Alternatively, the orientation can be different than that illustrated in FIG. 2A. For example, the base contact areas 234, 236 can be positioned above the flexible members 238, 240, or orientation can be rotated ninety degrees from that illustrated in FIG. 2A.

In FIG. 2A, the spaced base contact areas 234, 236 are defined by a generally "V" shaped groove that extends transversely through the clamp housing 230 along the X axis, with each side of the "V" defining one of the base contact areas 234, 236. In this embodiment, each base contact area 234, 236 is generally flat plate shaped. Alternatively, for example, the groove could have curved sides and the base contact areas 234, 236 could be curved.

The flexible members 238, 240 are spaced apart and cooperate to flexibly urge the optical fiber assembly 16 against the base contact areas 234, 236. The design of the flexible members 238, 240 can vary to achieve the desired pressure on the optical fiber assembly 16. In FIG. 2A, (i) the first flexible member 238 includes a first member attachment area 238A and a first member contact area 238B that is spaced apart from and cantilevers away from the first member attachment area 238A; and (ii) the second flexible member 240 includes a second member attachment area 240A and a second member contact area 240B that is spaced apart from and cantilevers away from the second member attachment area 240A. In this embodiment, each attachment area 238A, 240A is fixedly secured to the rest of the clamp housing 230 while the member contact areas 238B, 240B are spaced apart and cantilever away from the rest of the clamp housing 230.

Further, in FIG. 2A, each of the flexible members 238, 240 is has a somewhat "L" shaped cross-section and extends transversely along the X axis. In this embodiment, the vertical section of each flexible member 238, 240 defines a flexible region 242 while the horizontal section of each flexible member 238, 240 is a pivoting region 244 that defines the respective member contact area 238B, 240B. In certain embodiments, only the flexible regions 242 are designed to flex during use of the fiber clamp 220 while the pivoting regions 244 do not flex.

As provided herein, the characteristics (e.g. the size, shape, and thickness) of the flexible regions 220 as well as the relative positions of the contact areas 234, 235, 238B, 240B determines the force that is applied to the optical fiber assembly 16 by the fiber clamp 220. Thus, the amount of force across the optical fiber assembly 16 can be precisely controlled and programmed by adjusting the thickness, or the stiffness of the flexible members 246. With this design, the magnitude and direction of the forces applied to the optical fiber assembly 16 can be controlled and optimized. This can be a key piece of not changing the PER.

Further, in this embodiment, each of the member contact areas 238B, 240B is generally flat plate shaped. Alternatively, for example, each of the member contact areas 238B, 240B could be curved.

In FIG. 2A, the four contact areas 234, 236, 238B, 240B are spaced apart and form a somewhat rectangular shaped housing opening 246 for precisely retaining the optical fiber assembly 16. Alternatively, for example, the clamp housing 230 could be designed to have only three contact areas and the contact areas could define a somewhat triangular shaped housing opening.

It should be noted that the flexible members 238, 240 allow for some compliance between the areas 234, 236, 238B, 240B.

In certain embodiments, the entire clamp housing 230 (including the base contact areas 234, 236, and the flexible members 238, 240) is made of a one-piece, substantially homogeneous, integrally formed, unitary structure. In one embodiment, the clamp housing 230 is made from a solid block that is subsequently machined to define the base contact areas 234, 236, and the flexible members 238, 240. Alternatively, the clamp housing 230 including the base contact areas 234, 236, and the flexible members 238, 240 can be molded or cast into the shape illustrated in FIG. 2A.

Because the clamp housing 230 is made as a unitary structure, (and without multiple components that are attached together), the clamp housing 230 can be precisely made with minimal stack-up of tolerances. Stated in another fashion, because the clamp housing 230 is made as a unitary structure, the relative positions of the contact areas 234, 235, 238B, 240B and the characteristics (e.g. the size, shape, and thickness) of the flexible regions 220 can be designed and precisely manufactured to achieve the desired force that is applied to the optical fiber assembly 16 by the fiber clamp 220. As a result thereof, the pressure applied by the flexible members is substantially uniform, repeatable, controlled, and consistent pressure to the optical fiber. This can be a key piece of not changing the PER.

Further, the careful manufacture of the fiber clamp 220 guarantees that the forces on all contact areas 234, 238B between the fiber or ferrule and the fiber clamp 220 are essentially the same. Moreover, the value of the forces is defined by geometry choices and material selection.

Alternatively, the clamp housing 230 could be manufactured as multiple separate components that are subsequently assembled together. However, the stack-up of the tolerances of the multiple components could adversely influence the accuracy of the force that is being applied to the optical fiber assembly 16 by the fiber clamp 220.

The material utilized in the clamp housing 230 can vary. Suitable materials include metals such as steel, aluminum, titanium, or other materials such as plastic or ceramics.

The member mover 228 selectively moves (i) the first member contact area 238B relative to the first member attachment area 238A, (ii) the second member contact area 240B relative to the second member attachment area 240A, and/or (iii) the contact areas 238B, 240A relative to each other so that the optical fiber assembly 16 can be inserted into and/or removed from the housing opening 246. The design of the member mover 228 can vary. For example, the member mover 228 can be manually operated as provided below or the member mover 228 can be designed to include one or more actuators. One embodiment of the member mover 228 is described in more detail below.

Figure 2B:
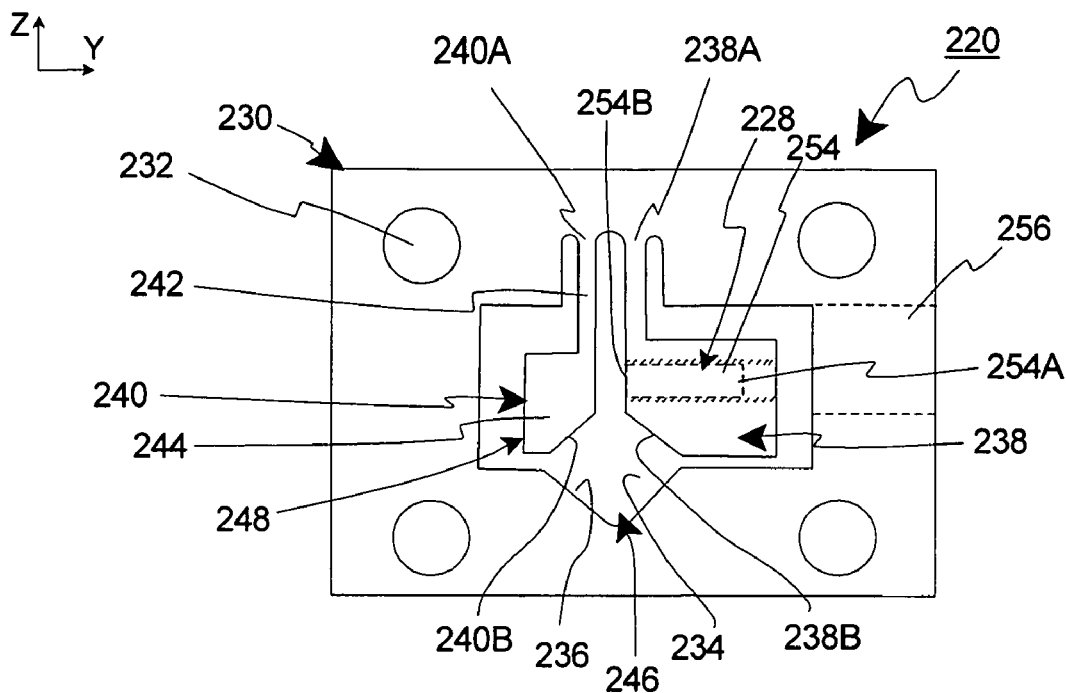
FIG. 2B is a simplified front plan view of the fiber clamp with a pair of flexible members in a first configuration.
Figure 2C:
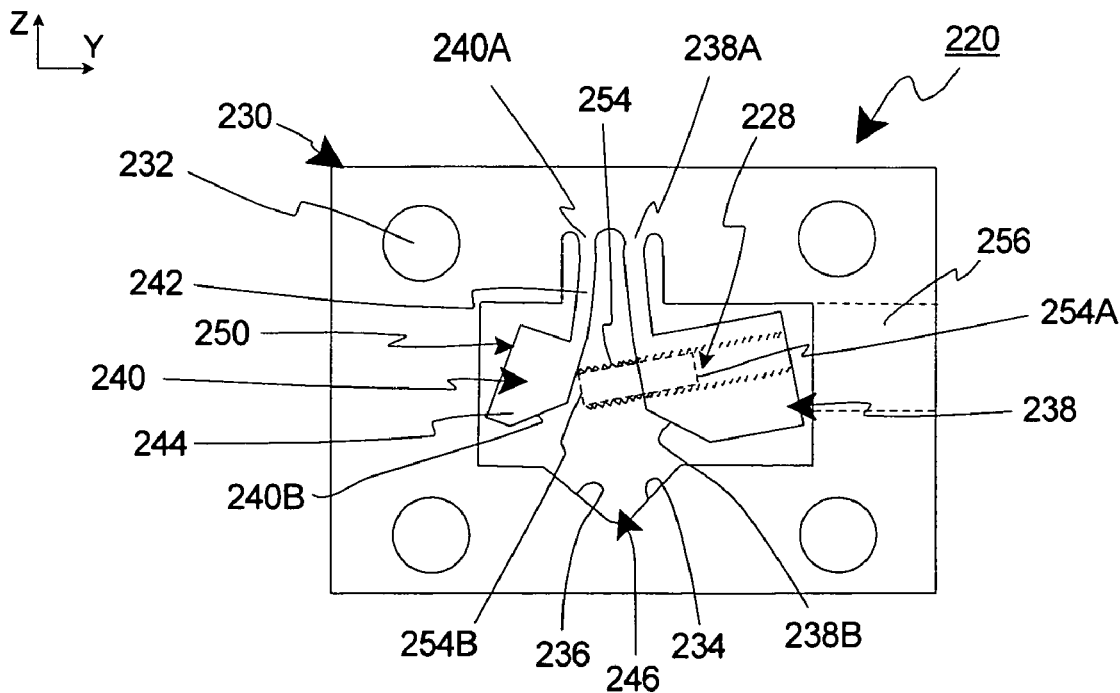
FIG. 2C is a simplified front plan view of the fiber clamp with the pair of flexible members in a second configuration.
Figure 2D:
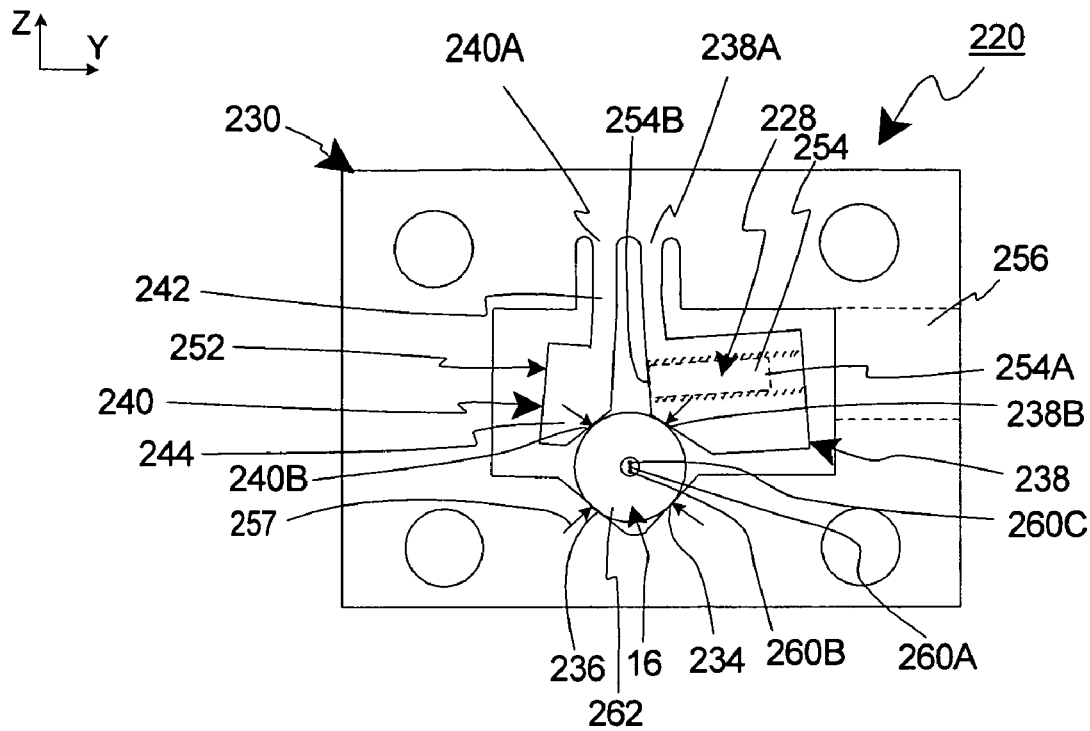
FIG. 2D is a simplified front plan view of the fiber clamp retaining an optical fiber assembly with the pair of flexible members in a third configuration.

FIG. 2B is a simplified front plan view of the fiber clamp 220 with the flexible members 238, 240 in a relaxed, first configuration 248; FIG. 2C is a simplified front plan view of the fiber clamp 220 with the flexible members 238, 240 moved to a deformed second configuration 250; and FIG. 2D is a simplified front plan view of the fiber clamp 220 with the flexible members 238, 240 in a deformed third configuration 252 retaining the optical fiber assembly 16. FIG. 2B illustrates the fiber clamp 220 in the originally manufactured configuration 248. It should be noted that the flexible members 238, 240 are closest together in the first configuration 248 and farthest apart in the second configuration 250.

In this embodiment, the member mover 228 moves (i) the first member contact area 238B relative to the first member attachment area 238A, (ii) the second member contact area 240B relative to the second member attachment area 240A, and (iii) the contact areas 238B, 240A relative to each other and the base contact areas 234, 236.

In FIGS. 2B-2D, the member mover 228 is an externally threaded beam 254 (e.g. a set screw) that is threaded into the pivoting region 244 of the first flexible member 238. Further, in this embodiment, the clamp housing 230 includes a clearance aperture 256 (that extends along the Y axis) that provides access to the threaded beam 254. With this design, a user (not shown) can access a head 254A of the threaded beam 254 to rotate the threaded beam 254. More specifically, in this design, rotation of the threaded beam 254 about the Y axis in a first rotational direction causes the threaded beam 254 to move from right to left along the Y axis and a distal end 254B to engage the second flexible member 240 to move the member contact areas 238B, 240B apart and away from the base contact areas 234, 236 as illustrated in FIG. 2C. In this position, the optical fiber assembly 16 can be easily inserted into the fiber clamp 220 between the contact areas 232, 234, 238B, 240B.

Further, rotation of the threaded beam 254 about the Y axis in a second rotational direction (that is opposite from the first rotational direction) causes the threaded beam 254 to move from left to right along the Y axis and the distal end 254B to not engage the second threaded member 240. This allows the threaded members 238, 240 to relax and the member contact areas 238B, 240B to urge the optical fiber assembly 16 against the base contact areas 234, 236 as illustrated in FIG. 2D.

In the third configuration 252, the compliant flexible members 238, 240 are bent a predetermined amount thereby applying a predetermined and even force on the optical fiber assembly 16. Additionally, as illustrated in FIG. 2D, at this time, the fiber clamp 220 (via the contact areas 234, 235, 238B, 240B) imparts a plurality of spaced apart, substantially radially directed forces 257 on the optical fiber assembly 16. In this embodiment, the four forces 257 are substantially symmetrically spaced apart and oriented relative to the optical fiber assembly 16. In one embodiment, the fiber clamp 220 serves to directly constrain the optical fiber assembly 16 in four degrees of freedom. The two remaining degrees of freedom, e.g. translation and rotation are addressed by friction forces generated by the contact normal forces and coefficient of friction between the optical fiber assembly 16 and the contact areas 234, 236, 238B, 240B.

In certain embodiments, the components of the fiber clamp 220 cooperate to apply substantially uniform and precise forces to the optical fiber assembly 16 without damaging the optical fiber assembly 16. For example, in alternative, non-exclusive embodiments, the contact areas 234, 236, 238B, 240B can cooperate to apply four forces 264 that each have a value of between approximately 1 and 100 lbf, between approximately 20 and 80 lbf, between approximately 30 and 70 lbf, or between approximately 40 and 60 lbf to the optical fiber assembly 16. Stated in another fashion, in alternative, non-exclusive embodiments, the contact areas 234, 236, 238B, 240B can cooperate to apply four forces 264 that each have a value of approximately 5, 10, 20, 30, 40, 50, 60, 70, 80, 90, 100, 110, or 120 lbf to the optical fiber assembly 16.

FIG. 2D also illustrates a distal fiber tip of the optical fiber assembly 16. In this embodiment, the optical fiber assembly 16 includes an optical fiber 260 and a fiber ferrule 262. In this embodiment, the optical fiber 260 includes (i) a core 260A, e.g. a thin strand of transparent material that carries optical signals that can be made of glass and plastic, (ii) a pair of stress rods 260B that extend parallel to the core 260A, and (iii) a fiber cladding 260C that encloses the core 260A and the stress rods 260B providing a protective and/or insulating layer. The fiber ferrule 262 is tubular and encircles the optical fiber 260. In certain embodiments, the fiber ferrule 262 is only as long as the width of the fiber clamp 220. In this embodiment, the forces from the fiber clamp 220 are applied to the fiber ferrule 262 and are transmitted through the fiber ferrule 262 to the optical fiber 260. Alternatively, the optical fiber assembly 16 can have another design.

Figure 3:
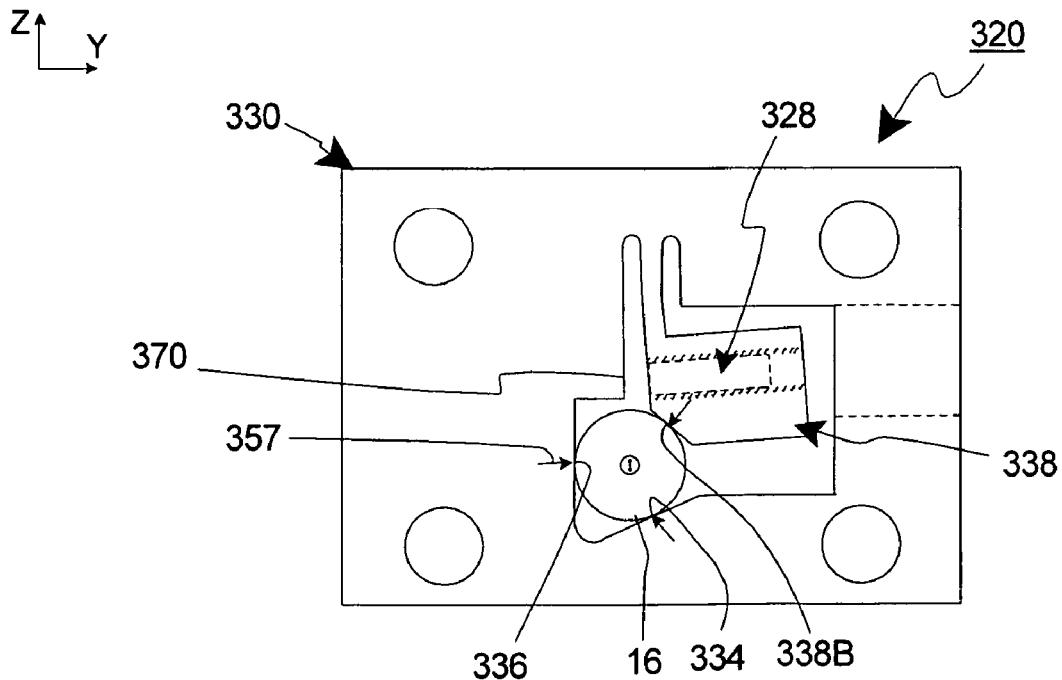
FIG. 3 is a simplified front plan view of another embodiment of the fiber clamp retaining the optical fiber assembly.

FIG. 3 is a simplified front plan illustration of the optical fiber assembly 16 and another embodiment of a fiber clamp 320 that is somewhat similar to the fiber clamp 220 described above. However, in this embodiment, the fiber clamp 320 includes the two base contact areas 334, 336 and only one flexible member 338. In this embodiment, the three contact areas 334, 336, and 338B impart three spaced apart, substantially radially directed forces 357 (illustrated as arrows) on the optical fiber assembly 16. In this embodiment, the forces from the fiber clamp 320 are applied to the fiber ferrule and are transmitted through the fiber ferrule to the optical fiber. Alternatively, the fiber clamp 320 could be designed with two flexible members and only one base contact area.

Further, in FIG. 3, the member mover 328 can rotated to engage an opposite wall 370 of the clamp housing 330 to selectively move the flexible member 338. In this embodiment, the clamp housing 330 can be made as a unitary, one-piece structure.

Figure 4:
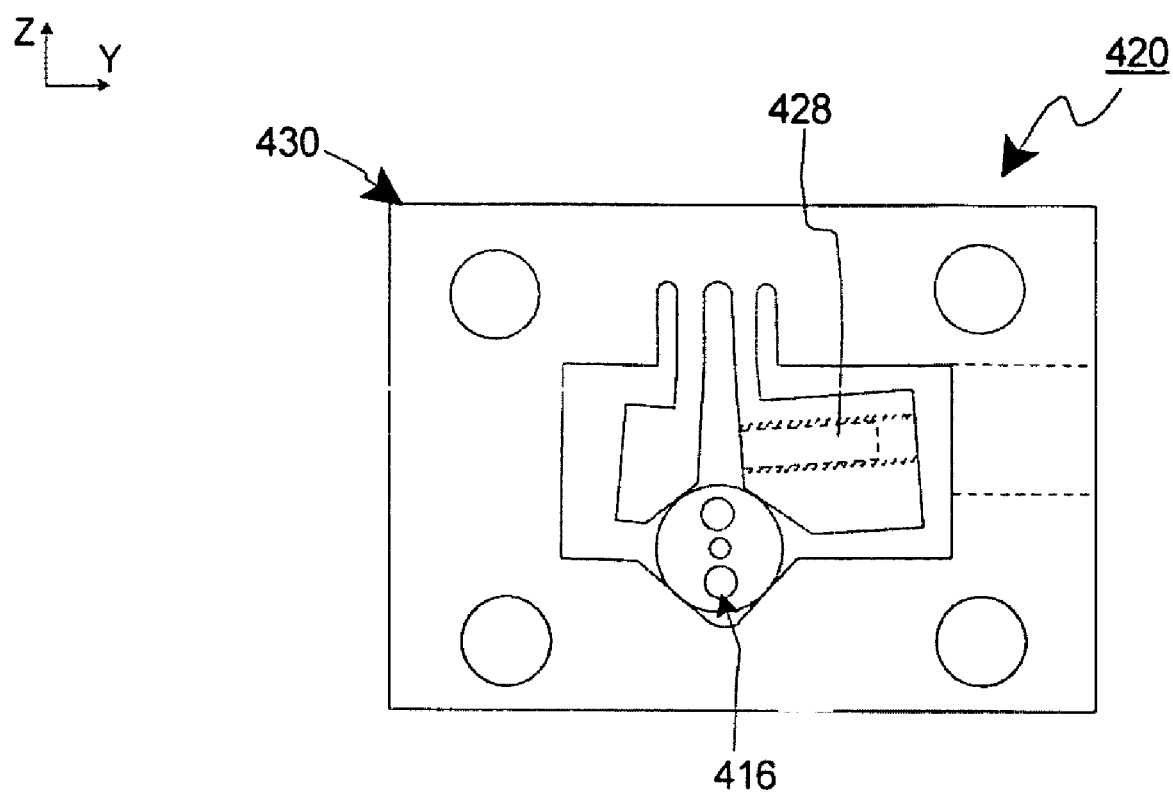
FIG. 4 is a simplified front plan view of the fiber clamp retaining another optical fiber assembly.

FIG. 4 is simplified illustration of yet another embodiment of the fiber clamp 420 that includes a clamp housing 430 and a member mover 428 that are somewhat similar to the corresponding components described above and an optical fiber assembly 416. In this embodiment, the optical fiber assembly 416 does not include the fiber ferrule (not shown in FIG. 4). With this design, the fiber clamp 420 directly engages the optical fiber 460.

While the particular designs as herein shown and disclosed in detail is fully capable of obtaining the objects and providing the advantages herein before stated, it is to be understood that it is merely illustrative of the presently preferred embodiments of the invention and that no limitations are intended to the details of construction or design herein shown other than as described in the appended claims.

What is claimed is:

1. A fiber clamp for clamping an optical fiber assembly, the fiber clamp comprising:
   a clamp housing including a base contact area, and a first flexible member that is adapted to urge the optical fiber assembly against the base contact area to retain the optical fiber assembly, the first flexible member including a first member attachment area, and a first member contact area that is adapted to engage the optical fiber assembly; wherein the clamp housing includes a second flexible member that is adapted to urge the optical fiber assembly against the base contact area, the second flexible member including a second member contact area that is adapted to engage the optical fiber assembly, and a second member attachment area; and wherein the base contact area and the flexible members are made of a one-piece, substantially homogeneous, unitary structure; and
   a member mover that selectively moves the first member contact area relative to the first member attachment area so that the optical fiber assembly can be inserted between the base contact area and the first member contact area.

2. The fiber clamp of claim 1 wherein the member mover includes a threaded beam that urges the first member contact area away from the base contact area.

3. The fiber clamp of claim 1 wherein the first member contact area cantilevers away from the first member attachment area.

4. The fiber clamp of claim 1 wherein the member mover selectively moves the second member contact area relative to the first member contact area so that the optical fiber assembly can be inserted between the base contact area and the member contact areas.

5. The fiber clamp of claim 1 wherein (i) the first member contact area cantilevers away from the first member attachment area, and (ii) the second member contact area cantilevers away from the second member attachment area.

6. The fiber clamp of claim 1 wherein the member mover extends between the flexible members to urge member contact areas apart.

7. A precision apparatus including an optical element, an optical fiber assembly, and the fiber clamp of claim 1 retaining the optical fiber.

8. A fiber clamp for clamping an optical fiber assembly, the fiber clamp comprising:
   a clamp housing including a base contact area, and a first flexible member that is adapted to urge the optical fiber assembly against the base contact area to retain the optical fiber assembly, the first flexible member including a first member attachment area, and a first member contact area that is adapted to engage the optical fiber assembly; wherein the clamp housing includes a second flexible member that is adapted to urge the optical fiber assembly against the base contact area, the second flexible member including a second member contact area that is adapted to engage the optical fiber assembly, and a second member attachment area; and
   a member mover that selectively moves the first member contact area relative to the first member attachment area so that the optical fiber assembly can be inserted between the base contact area and the first member contact area; wherein the member mover extends between the flexible members to urge member contact areas apart; and wherein the member mover includes a threaded beam that is threaded into the first flexible member, wherein rotation of the threaded beam in a first rotational direction causes the threaded beam to engage the second flexible member to move the member contact areas apart, and wherein rotation of the threaded beam in a second rotational direction causes the threaded beam to disengage from the second flexible member to allow the contact areas to move towards each other.

9. A fiber clamp for clamping an optical fiber assembly, the fiber clamp comprising:
   a clamp housing including a base contact area, and a first flexible member that is adapted to urge the optical fiber assembly against the base contact area to retain the optical fiber assembly, the first flexible member includes a first member attachment area, and a first member contact area that is adapted to engage the optical fiber assembly; wherein the base contact area and the first flexible member are made of a one-piece, substantially homogeneous, unitary structure; wherein the clamp housing includes a second flexible member that is adapted to urge the optical fiber assembly against the base contact area, the second flexible member including a second member contact area that is adapted to engage the optical fiber assembly, and a second member attachment area; wherein the second member contact area cantilevers away from the second member attachment area; and
   a member mover that selectively moves the first member contact area relative to the first member attachment area so that the optical fiber assembly can be inserted between the base contact area and the first member contact area; wherein the first member contact area cantilevers away from the first member attachment area.

10. The fiber clamp of claim 9 wherein the member mover selectively moves the second member contact area relative to the first member contact area so that the optical fiber assembly can be inserted between the base contact area and the member contact areas.

11. The fiber clamp of claim 10 wherein the member mover extends between the flexible members to urge member contact areas apart.

12. The fiber clamp of claim 11 wherein the member mover includes a threaded beam that is threaded into the first flexible member, wherein rotation of the threaded beam in a first rotational direction causes the threaded beam to engage the second flexible member to move the member contact areas apart, and wherein rotation of the threaded beam in a second rotational direction causes the threaded beam to disengage from the second flexible member to allow the contact areas to move towards each other.

13. A precision apparatus including an optical element, an optical fiber assembly, and the fiber clamp of claim 9 retaining the optical fiber.

* * * * *